United States Patent [19]
Gee et al.

[11] Patent Number: 4,781,257
[45] Date of Patent: Nov. 1, 1988

[54] SUSPENSION STRUCTURE FOR A TRACKED VEHICLE

[75] Inventors: James E. Gee, Washington; Andrew J. Tonsor, East Peoria; David E. Nelson, Peoria; Ronald L. Satzler, Princeville, all of Ill.

[73] Assignee: Caterpillar Inc., Peoria, Ill.

[21] Appl. No.: 90,476

[22] Filed: Aug. 28, 1987

[51] Int. Cl.$^4$ .................................... B62D 55/06
[52] U.S. Cl. ...................................... 180/9.5; 305/21
[58] Field of Search ............... 180/9.5, 9.52, 9.1, 180/9.62, 9.64, 6.48; 305/21, 22

[56] References Cited

U.S. PATENT DOCUMENTS

| | | | |
|---|---|---|---|
| 1,253,319 | 1/1918 | White | 180/6.7 |
| 1,275,343 | 8/1918 | White | 305/27 |
| 1,512,152 | 10/1924 | White | 180/9.5 |
| 1,806,819 | 5/1931 | Paulsen | 180/9.54 |
| 1,913,705 | 6/1933 | Erdahl | 180/9.6 |
| 2,057,211 | 10/1936 | Shere | 180/9.5 |
| 2,670,249 | 2/1954 | Pilch | 305/8 |
| 2,786,724 | 3/1957 | Armington et al. | 305/9 |
| 2,936,841 | 5/1960 | Mazzarins | 180/9.54 |
| 3,435,908 | 4/1969 | Sunderlin et al. | 180/9.44 |
| 3,825,309 | 7/1974 | Krolak et al. | 305/31 |
| 3,899,218 | 8/1975 | Blomstrom | 305/9 |
| 3,974,891 | 8/1976 | Persson | 180/9.5 X |
| 3,990,528 | 11/1976 | Haak et al. | 180/9.62 |
| 4,166,511 | 9/1979 | Stedman | 180/9.5 |
| 4,174,763 | 11/1979 | Fukui | 180/6.48 |
| 4,226,293 | 10/1980 | Bieker | 180/9.5 |
| 4,410,219 | 10/1983 | van der Lely | 305/35 |

FOREIGN PATENT DOCUMENTS 2149731 6/1985 United Kingdom .

OTHER PUBLICATIONS

Claas Rice Equipment Dominator—Published Circa Jun. 1986; Cat Parts Book-SEBP1316-Published Jan., 1981 pp. 1, 156 and 159).

Primary Examiner—John A. Pekar
Attorney, Agent, or Firm—Charles E. Lanchantin, Jr.

[57] ABSTRACT

A vehicle such as a combine harvester or the like includes a main frame and a first and second undercarriages for supporting the main frame and individually having front and rear wheel assemblies and a track encircling the wheel assemblies. A suspension structure therefore includes a laterally spaced apart pair of pivot joints adjacent the front wheel assemblies for pivotally connecting the undercarriages to the main frame, and a coupling assembly adjacent the rear wheel assemblies for centrally supporting the main frame on the undercarriages. A hydraulic motor powerably rotates each of the rear wheel assemblies and an inside support device is provided therefor that includes a stabilizing beam. The coupling assembly includes an equalizer bar having outer ends, and the stabilizing beam extends rearwardly beyond the driven rear wheel assemblies for connection to the outer ends. Also, an outside support device releasably clamps the rear wheel assemblies to the undercarriages.

24 Claims, 5 Drawing Sheets

Fig-4

Fig_6_

Fig_7_  Fig_8_

4,781,257

SUSPENSION STRUCTURE FOR A TRACKED VEHICLE

TECHNICAL FIELD

This invention relates generally to a tracked vehicle such as a combine harvester, earthmoving machine or the like, and more particularly to the suspension structure therefor.

BACKGROUND ART

Track-type undercarriages, such as those individually having either a track chain or an elastomeric belt entrained about a rear driving wheel assembly and a front idler wheel assembly, are known to exhibit markedly superior performance characteristics in certain respects over wheel suspension systems. These track-type undercarriages provide reduced ground pressure per unit area of contact and increased traction. Moreover, uneven and soft terrain vehicles equipped with track-type undercarriage have improved flotation and stability, and are more efficient than wheeled vehicles.

Most crawler tractors have two track-type undercarriages which are pivotally mounted on aligned shafts to the rear of the main frame and which are adapted to limitedly swing in vertical, longitudinally oriented planes. Oscillation of the undercarriages is desirable to accommodate surface irregularities and to reduce shock loads, and the front portions thereof are often interconnected by an equalizer bar or generally equivalent leaf spring assembly which is centrally connected to the main frame. Exemplifying the art in this 3-point main frame suspension area are: U.S. Pat. Nos. 1,512,152 issued to R. H. White on Oct. 21, 1924; 2,786,724 issued to R. Q. Armington, et al on Mar. 26, 1957; 2,936,841 issued May 17, 1960 to J. Mazzarins; and 3,899,218 issued to G. D. Blomstrom, et al on Aug. 12, 1975.

The aforementioned patents are generally illustrative of the large number of coupling devices that have been proposed for connecting the equalizer bar to both undercarriages and to the main frame of the vehicle in order to accommodate the tendency of the front end of the undercarriages to pull inwardly towards each other during oscillation. In addition to accommodating such compound angular misalignment of the undercarriages, it is often desirable to avoid the complexities of providing a fixed power transfer mechanism for driving the rear wheel assembly. Historically, the undercarriages have been mounted on the main frame for pivotal movement about the transverse axis of the rear drive wheel assemblies. But, it has been found that when large implement forces are imposed on the bearings of the rear drive wheel assemblies, such as are encountered when using a bulldozer blade, there is a marked decrease in the surface life of the bearings and associated elements. Accordingly, the undercarriages have often been pivoted on shafts located typically forwardly of the axis of the rear drive wheel assemblies so that operating forces on the undercarriages and on the implement can be directed thereto independent of the rear drive wheel assemblies.

Because the axis of the drive wheel assembly is spaced away from the pivot axis, it travels in an arcuate path with oscillation of the undercarriage. This adds considerable cost and complexity to the mechanical drive train powering the rear drive wheel assembly.

It has been found that many combine harvesters equipped with wheels could not be operated under wet and muddy conditions at the time the crop was ready to be harvested. In order to overcome this significant agricultural problem, the CLAAS OHG combine harvester manufacturer of D-4834 Harsewinkel 1, Federal Republic of Germany has replaced each of the front drive wheels with a drive sprocket and has pivotally supported an undercarriage to the frame below each sprocket. The front and rear idler wheels on the undercarriage and the elevated drive sprocket are encircled by a multi-jointed, metallic track chain in a triangular configuration. This has enabled the combine to traverse safely over soft ground because the majority of the weight is more evenly distributed through the undercarriage and tracks. Steering of this combine, and other combines modified in substantially the same way, is still accomplished by the usual rear steering wheels which undesirably have relatively high pressure contact with the ground. Accordingly, this specialized attachment suspension system is partially track and partially wheels, so that the full benefits of a totally track-supported suspension structure are not realized. Moreover, such combines typically have a relatively light main frame utilizing thin beams, diagonal braces, and plates, and it is therefore difficult to connect the combine to separate extended-length undercarriages with the desired degree of structural integrity.

Therefore, what is desired is a suspension structure for a tracked vehicle such as a combine harvester that is rugged and economical, that can better distribute the weight of the superstructure to the ground, and that is compatible with the work implement on the vehicle during negotiation of uneven terrain. Moreover, the suspension structure should include laterally spaced apart undercarriages individually including front and rear wheel assemblies and an endless belt or track looped about the wheel assemblies, and wherein the undercarriages are individually pivoted for limited oscillation with respect to one end of the main frame for navigating and conforming to irregular and soft terrain. Means is also required for centrally supporting the other end of the main frame on the undercarriages while preventing uncontrolled lateral spreading thereof. Preferably, the suspension structure should not require any mechanical drive components to the drive wheel assemblies through the pivot shaft axes so as to avoid the complexities associated therewith, while also providing independent powered drive to both tracks for steering purposes. Also, for the greatest simplicity, the drive wheels should preferably be powered by individual motors releasably supported in a rugged manner to the undercarriage frames.

DISCLOSURE OF THE INVENTION

The present invention is directed to overcoming one or more of the above problems.

In one aspect of the invention there is provided a suspension structure for a vehicle including a main frame having first and second ends, first and second undercarriages individually having first and second wheel assemblies and an endless ground-engaging track encircling the wheel assemblies. The suspension structure desirably includes pivot means adjacent the second wheel assemblies and elevationally below the main frame for pivotally connecting each of the undercarriages to the first end of the frame while permitting pivotal movement of the undercarriages about a generally horizontal and transverse axis, coupling means adjacent the first wheel assemblies for centrally supporting the second end of the frame on the undercarriages while preventing uncontrolled lateral spreading of the undercarriages, and drive means for independently rotating the first wheel assemblies including a motor mounted on each of the undercarriages away from the pivot means.

In another aspect of the invention there is provided a suspension structure for a vehicle including a main frame having a front end, a rear end, first and second undercarriages individually having a track roller frame, front and rear wheel assemblies and a ground-engaging track encircling the wheel assemblies. Advantageously, the suspension structure includes pivot means for pivotally connecting the undercarriages supportably to the front end of the main frame adjacent the front wheel assemblies and permitting pivotal movement of the undercarriages about a common horizontal and transversely oriented axis, and coupling means for centrally supporting the rear end of the main frame on the undercarriages and preventing uncontrolled spreading of the undercarriages, the coupling means including an equalizer bar having outer ends connected to the respective track roller frame adjacent the rear wheel assemblies.

In a further aspect of the invention, a suspension structure is provided for a vehicle of the type having a main frame and an undercarriage including a track roller frame, first and second wheel assemblies on the track roller frame, and a track encircling the wheel assemblies. The suspension structure features a motor for rotatably driving the first wheel assembly along a common axis, outside support means for releasably connecting the first wheel assembly to the track roller frame, and inside support means for releasably connecting the drive motor to the track roller frame.

Preferably, each of the undercarriages has a rear drive wheel assembly, a hydraulic motor and a disc type brake assembly serially arranged along a common transverse axis and these portions are releasably secured to the track roller frame of the undercarriage for servicing purposes and are adapted to swing therewith during oscillation of the undercarriages. Each undercarriage includes a member defining a semi-cylindrical socket, and a releasable semi-cylindrically socketed end cap is used for clamping the rear drive wheel assembly to the track roller frame. Also, an elongate stablizing beam supports the motor laterally inwardly of the rear drive wheel assembly. A rearward extension on the stabilizing beam forms a portion of a spherical joint that serves to connect the outer ends of the equalizer bar to the respective undercarriages to the rear of the drive wheel assemblies.

BEST MODE FOR CARRYING OUT THE INVENTION

Figure 1:
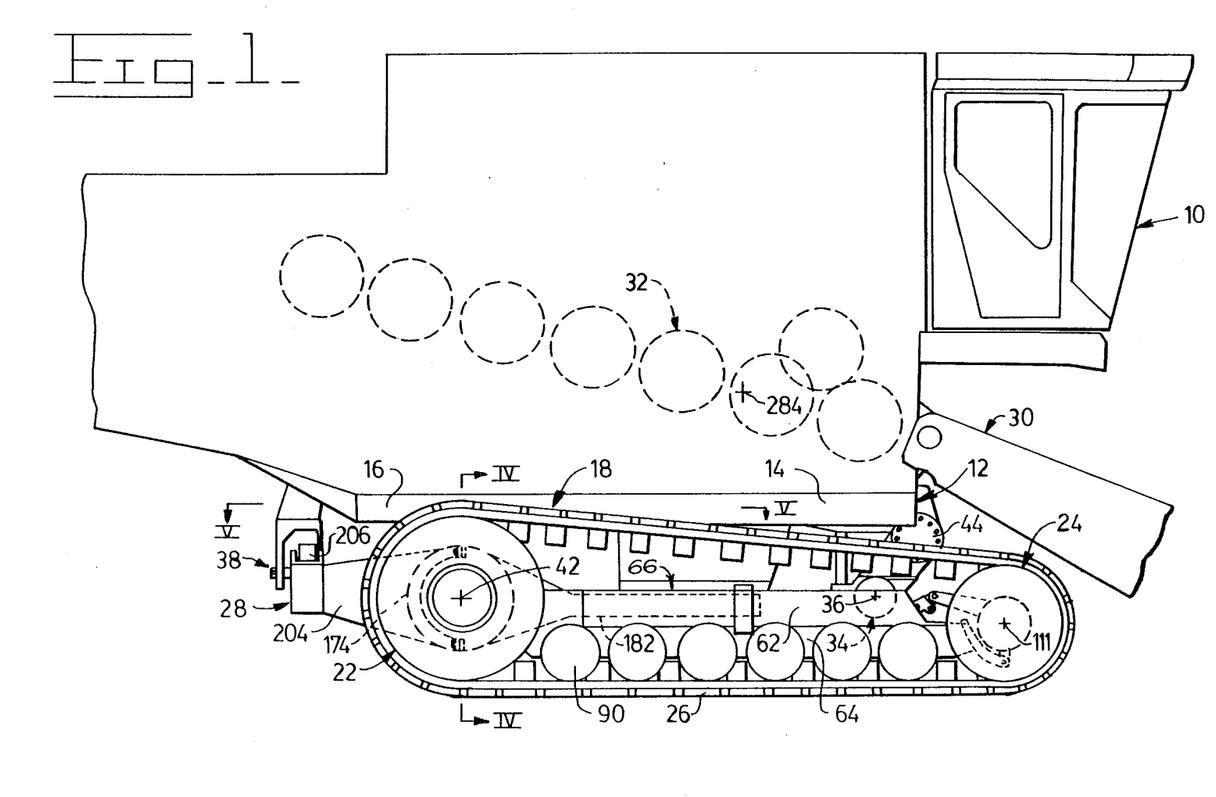
FIG. 1 is a diagrammatic right side elevational view of a combine harvester employing a suspension structure for a tracked vehicle constructed in accordance with the present invention, and illustrating only a portion of the harvesting implement mounted on the front thereof.
Figure 6:
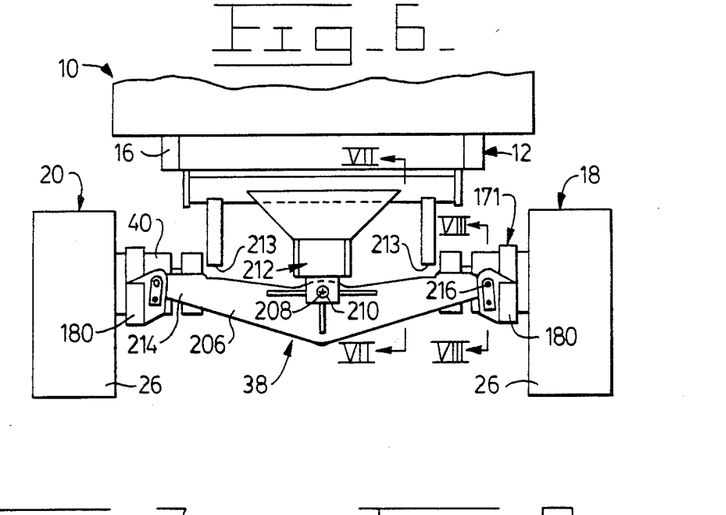
FIG. 6 is a diagrammatic, rear end view of the combine harvester illustrated in FIG. 1 showing the equalizer bar connection structure associated with the rear coupling means.

Referring to FIG. 1, there is shown a combine harvester vehicle 10 having a longitudinally extending main frame 12 with a first end or front end 14 and a second end or rear end 16 located respectively to the right and left when viewing the drawing. Right and left hand track-type undercarriages 18 and 20 are located generally elevationally below the main frame and provide the sole support for the vehicle as is illustrated in FIG. 6. These undercarriages are essentially mirror images of each other, and individually include a drive wheel assembly 22 and an idler wheel assembly 24 located respectively at the rear and front ends thereof. A ground-engaging track or belt 26 encircles these wheel assemblies in the form of an endless loop in a well-known manner. In accordance with the present invention, a track-type suspension structure 28 provides the support for the combine harvester 10 and permits the harvesting of crops such as sugar cane, vegetables, rice and grains in predominantly soft and wet ground conditions. A conventional front-mounted harvesting implement 30, only a fragment of which is illustrated, is effective to gather the crop with forward movement of the vehicle and to urge it upwardly and rearwardly through the centrally located throat of a suitable threshing mechanism 32. It is to be understood that the harvesting mechanism itself could be of any suitable form, and that the depiction of the present invention within the context of a combine harvester is for purposes of example only, the invention also being adaptable to other forms of track-type or crawler vehicles.

Figure 2:
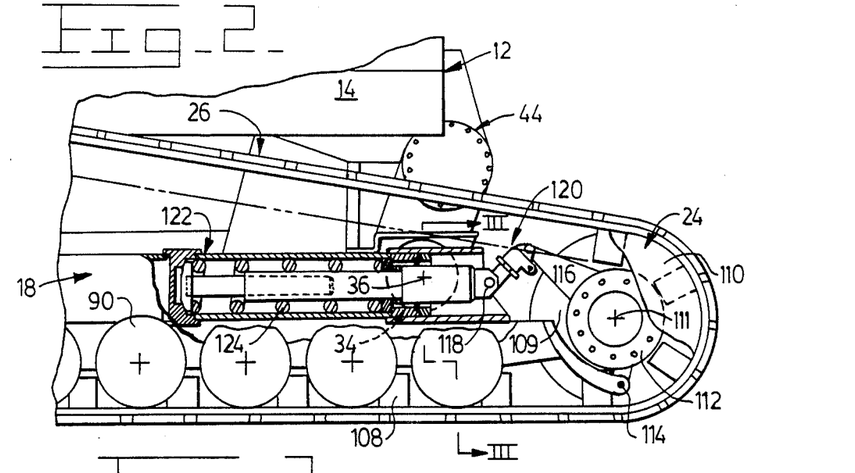
FIG. 2 is a diagrammatic and enlarged right side elevational view of the front portion of the undercarriage illustrated in FIG. 1 with a substantial part of the outer wheel portion removed and with the recoil mechanism shown broken open to better illustrate details thereof.
Figure 3:
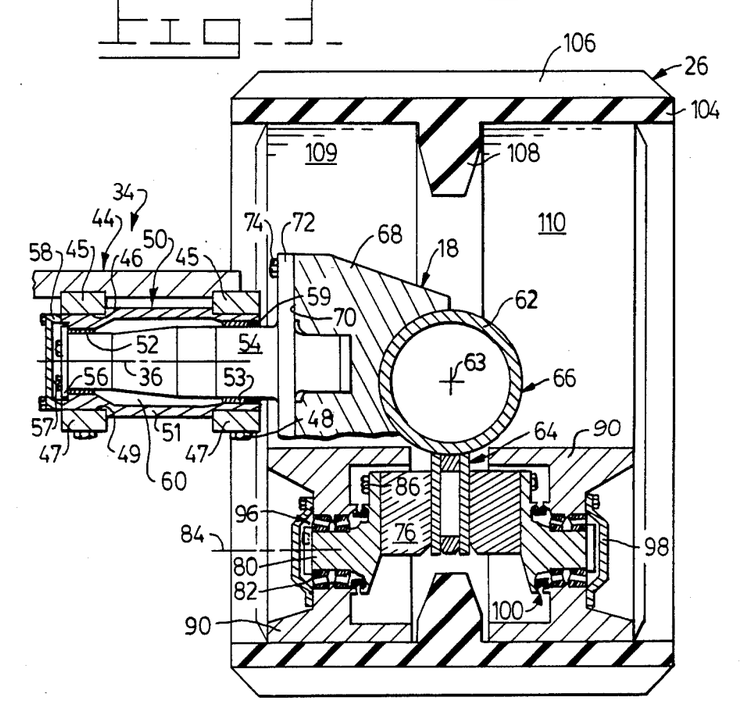
FIG. 3 is a diagrammatic and further enlarged cross sectional view through the front portion of the right hand undercarriage as taken along the line III—III of FIG. 2 and illustrating the pivot means for the track roller frame.
Figure 7:
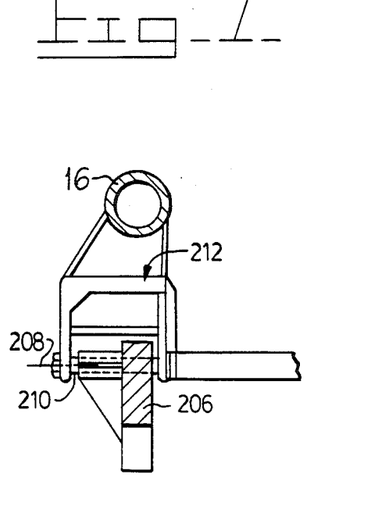
FIG. 7 is a diagrammatic and fragmentary cross sectional elevational view as taken along the line VII—VII of FIG. 6 illustrating the central connection of the equalizer bar to the main frame.
Figure 8:
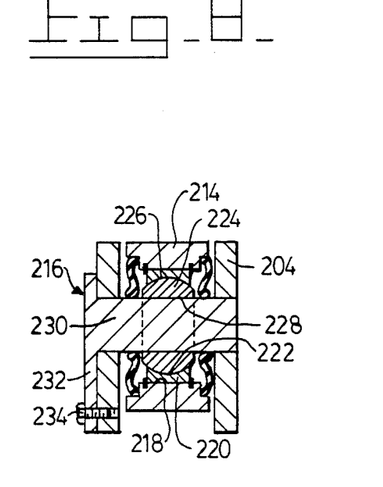
FIG. 8 is a diagrammatic and enlarged fragmentary sectional view through a spherical joint connecting the right hand end of the equalizer bar to the undercarriage and as taken along line VIII—VIII of FIG. 6.

Basically, the suspension structure 28 includes pivot means or a pair of laterally separated pivot joints 34 for pivotally connecting the undercarriages 18 and 20 supportably to the front end 14 of the main frame 12 and permitting pivotal movement of the undercarriages about a common horizontal and transversely oriented pivot axis 36 as is illustrated best in FIGS. 2 and 3. The suspension structure further includes coupling means or a coupling assembly 38 for centrally supporting the rear end 16 of the main frame on the undercarriages, preventing uncontrolled lateral spreading of the undercarriages, and transferring side forces laterally between the undercarriages as is shown in FIGS. 6, 7 and 8. And still further, the suspension structure includes drive means or a pair of drive motor mechanisms 40 for independently powerably rotating each of the rear wheel assemblies 22 along its respective transverse and horizontal axis 42 as may be appreciated by reference to FIGS. 4 and 5.

More specifically, the representative pivot joint 34 illustrated in FIGS. 2 and 3 includes a depending bracket 44 which is releasably secured to the front end 14 of the main frame 12. The bracket supports a pair of depending support blocks 45, with each block defining a downwardly facing semi-cylindrical internal surface or pocket 46. A pair of retention caps 47 are releasably secured to these blocks by a plurality of upwardly extending fasteners or bolts 48. Each of the retention caps defines an upwardly facing semi-cylindrical internal surface or pocket 49, so that the blocks and caps are adaptable to releasably clamp a stepped tubular housing 50 therebetween. The tubular housing has a raised rib 51 centrally therearound which is axially entrapped between the blocks and caps, and the tubular housing contains inner and outer sleeve bearings 52 and 53. A stepped and generally cylindrical stubshaft 54 is supported for pivotal movement about the axis 36 in these sleeve bearings and has an end retention cap 56 which is releasably secured to the inner end of the stubshaft by one or more threaded fasteners or bolts 57 for restricting lateral motion therebetween. A cover 58 is releasably secured to the inner end of the tubular housing 50, and an annular seal ring 59 is disposed between the outer end of the tubular housing and the stubshaft for containing a lubricant within an enclosed chamber 60 defined thereby. Because the opposite pivot joints 34 are transversebly separated, additional space is advantageously provided that can be utilized for greater ground clearance or for components mounted on the vehicle such as the centrally located throat of the threshing mechanism 32.

The right hand undercarriage 18 includes an elongate tubular member 62 defining a longitudinally oriented central axis 63 and an elongate beam 64 connected to the bottom surface of the tubular member by welding or the like to define a track roller frame 66. A support bracket 68 is also connected to the tubular member 62 by welding or the like, and preferably defines a flat, vertically oriented, inside mounting surface 70 parallel to the longitudinal axis 63 of the tubular member. A mounting plate 72 integrally secured to the stubshaft 54 is releasably secured to the mounting surface 70 by a plurality of threaded fasteners or bolts 74. These fasteners are disposed generally about the periphery of the mounting plate and extend therethrough, and are screwthreadably received in the support bracket (68).

The track roller frame 66 also includes a plurality of support pads 76 suitably connected to the opposite sides of the beam 64. A stubshaft 80 defining a cylindrical surface 82 and a transverse central axis 84 is releasably secured to each one of these support pads by a plurality of threaded fasteners or bolts 86 screwthreadably received in the support pads. A roller wheel 90 is rotatably supported on each of the stubshafts by an opposed pair of tapered roller bearing assemblies identified generally by the reference number 96 and seated on the cylindrical surface 82. An end cap 98 is releasably secured to the roller wheel in covering relation to the end of the stubshaft, and an annular seal assembly 100 is located between the stubshaft and the roller wheel to contain lubricant therewithin and to exclude dirt or other foreign material therefrom. FIG. 3 also illustrates a cross sectional view of the preferred endless track belt 26 which is defined by a relatively flat elastomeric body 104 having a plurality of inclined external ground-engaging bars 106 and a plurality of internal guide members 108 integrally formed therewith. The belt is preferably reinforced by internal cables or the like, not illustrated, so that it is substantially inextensible. It is to be appreciated that a multi-jointed metallic track chain could also be used without departing from the spirit of the present invention, and that the term "ground-engaging track" as used herein can include either an elastomeric belt of the preferred type illustrated or a metallic track chain such as has been used in the earthmoving industry for many years, although not shown.

In order to apply proper tension to the track belt 26 and to allow obstacles in the path of the vehicle to be traversed with minimum shock to the undercarriage 18, the front idler wheel assembly 24, including inner and outer wheel-portions 109 and 110, is supported for rotation about a transverse axis 111 by a carrier 112 pivotally connected to the lower front end of the track roller frame 66 by a pivot pin 114. The carrier 112 is centrally disposed between the wheel portions and has a rearwardly and upwardly extending arm 116 which is connected to the front end of a connecting rod 118 via an adjustable length coupling link 120. The connecting rod is continually urged to the right when viewing FIG. 2 by a resiliently loaded recoil mechanism 122 including a relatively large coiled compression spring 124. This rockable idler wheel assembly and associated recoil mechanism are of the general type disclosed in U.S. Pat. No. 3,899,218 issued to G. D. Blomstrom, et al on Aug. 12, 1975, and assigned to the assignee of the present invention.

Figure 4:
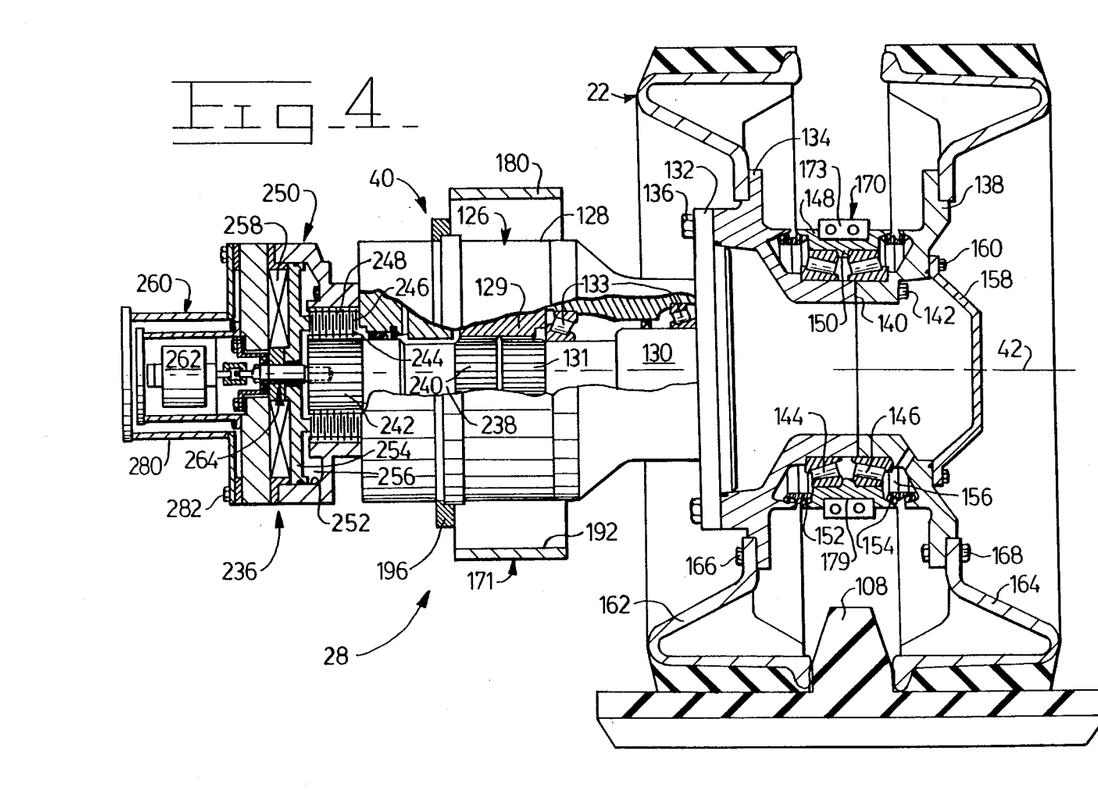
FIG. 4 is a diagrammatic and enlarged cross sectional view through the rear drive portion of the right hand undercarriage as taken along the line IV—IV of FIG. 1, with portions thereof shown in elevation for convenience.
Figure 5:
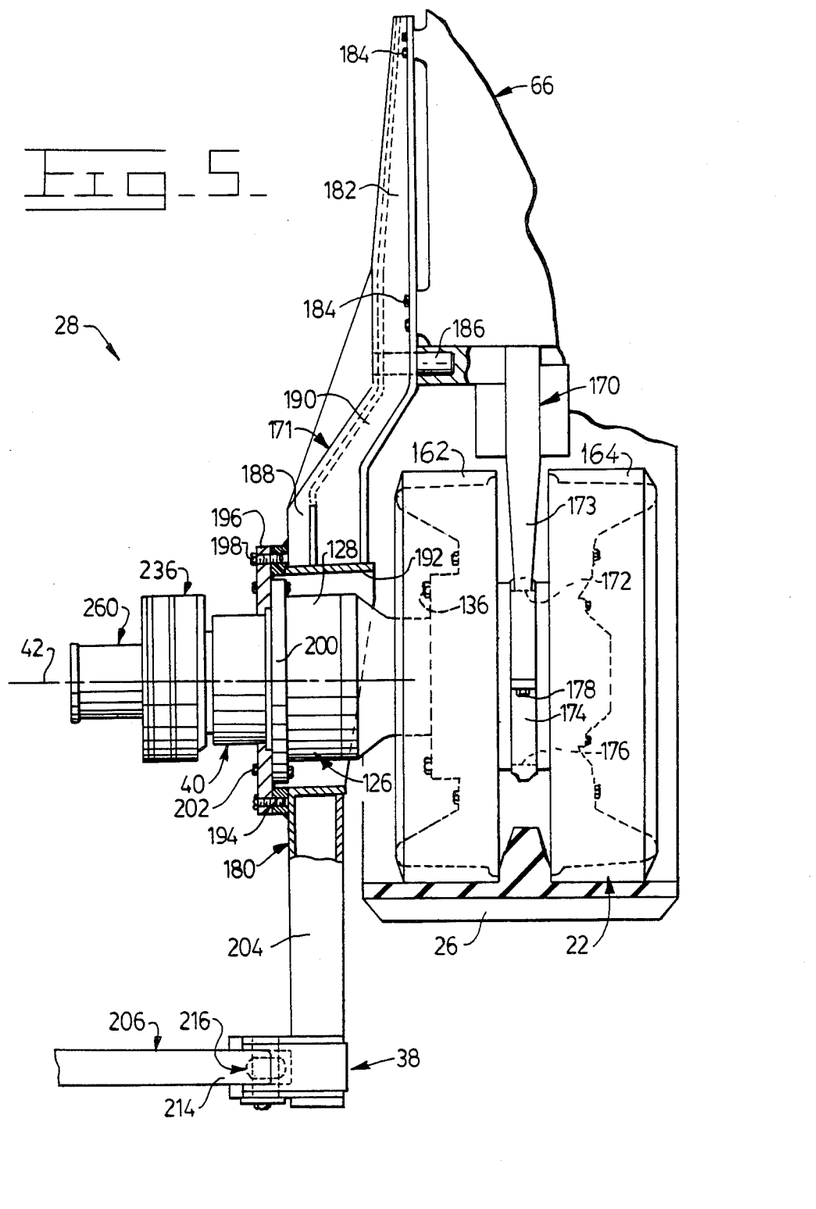
FIG. 5 is a diagrammatic and enlarged top plan view of the rear portion of the right hand undercarriage as taken along the line V-V of FIG. 1 and with a portion broken away and in cross section to show details of the inside support device.

Referring now to FIGS. 4 and 5, the drive motor mechanism 40 associated with the rear wheel assembly 22 can be noted to preferably include a two-speed or dual displacement hydraulic motor 126. The hydraulic motor is of the reversible radial piston type having a plurality of rollers that roll on a plurality of exterior cams as is known in the art, although not illustrated. Such motors are, for example, commercially produced by Poclain Hydraulics of France and are highly efficient in producing high torque either in a low speed range or a high speed range. In order to obtain the high range and to increase the output speed, the pressure supply to half the pistons is bypassed through a suitable control assembly, not illustrated.

More specifically, the hydraulic motor 126 includes a stationary and generally tubular housing 128, an internally splined motor output member 129, and an output shaft 130 releasably connected to the output member by an external spline 131. The output shaft is arranged to rotate along the transverse axis 42 on an opposed pair of tapered roller bearing assemblies 133, and rotates an annular mounting flange 132 connected thereto. An axially inner carrier member 134 of the rear wheel assembly 22 is releasably secured to the mounting flange 132 by a plurality of threaded fasteners or bolts 136. Also, an axially outer carrier member 138 is releasably secured to the inner carrier member 134 at a separation joint 140 by a plurality of threaded fasteners or bolts 142. An inner tapered roller bearing assembly 144 is seated on the inner carrier member, and an outer tapered roller bearing assembly 146 is seated on the outer carrier member in an opposed manner at either side of the separation joint. A support band 148 embraceably encircles these two juxtaposed bearing assemblies with a radially inwardly extending annular web 150 disposed between them for transmitting thrust loads from the wheel assembly 22 to the support band. An inner seal ring assembly 152 is disposed between the inner carrier member 134 and the support band 148, and an outer seal ring assembly 154 is disposed between the outer carrier member and the support band to define an enclosed compartment 156 for containing lubricant for the roller bearing assemblies and for excluding dirt and foreign material therefrom. A protecting cover 158 is releasably secured to the outer carrier member 138 by a plurality of fasteners or bolts 160. The wheel assembly 22 further includes an inner wheel portion 162 and an outer wheel portion 164 that are releasably and respectively secured to the inner carrier member 134 and outer carrier member 138 by pluralities of threaded fasteners 166 and 168. Note that the belt guide members 108 of the belt 26 are contained in side thrust transmitting relation between the wheel portions.

As shown by FIGS. 4 and 5, the suspension structure 28 features an outside support device 170 and an inside support device 171 for each of the drive wheel assemblies 22. The outside support device 170 includes a rearwardly facing semi-cylindrical pocket 172 defined in a plate-like extension 173 of the track roller frame 66, and a C-shaped retention cap 174 defining a forwardly facing semi-cylindrical pocket 176. The cap is releasably secured to the roller frame by a plurality of threaded fasteners or bolts 178. As is illustrated in FIG. 4, the support band 148 defines an outwardly facing peripheral recess 179 and the extension 173 and the retention cap 174 are disposed within the recess and effective to releasably secure the support band to the track roller frame.

As shown in FIG. 5, the inside support device 171 includes an elongate fabricated stabilizer beam or subframe 180 which has a front portion 182 of a box-shaped cross section releasably secured to the rear inside part of the track roller frame 66 by spaced apart threaded fasteners or bolts 184. Preferably, one or more relatively large cylindrical dowel pins 186 are secured to the track roller frame for initially positioning the stabilizer beam on the frame and to better transfer shear loads therebetween. A central portion 188 of the stabilizer beam is disposed in laterally inwardly offset relation to the front portion 182 by an inclined transition portion 190 located integrally therebetween of a box-shaped cross section. The central portion 188 defines a tubular opening 192 transversely therethrough and a plurality of inwardly facing threaded bores 194 located peripherally about the opening. An annular adapter plate 196 is releasably secured to the central portion 188 by a plurality of threaded fasteners or bolts 198 which extend therethrough and are screwthreadably received in the bores 194. A mounting flange 200 defined on the periphery of the motor housing 128 is also releasably secured to the adapter plate 196 by a second plurality of threaded fasteners or nut and bolt assemblies 202 located generally radially within the fasteners 198.

Advantageously, the inside support device 171 for the rear wheel assembly 22 also defines a rear portion 204 of the stabilizer beam 180 of a box-shaped cross section that serves as a connection point for the rear coupling assembly 38 between the opposite track roller frames 66. As is also shown in FIGS. 6-8, the coupling means 38 includes an equalizer bar 206 mounted for pivotal movement about a longitudinal central axis 208 of the vehicle 10 by a pivot pin 210. An inverted saddle assembly or depending clevis 212 is integrally secured to the rear end 16 of the main frame 12 of the vehicle, and the ends of the pivot pin 210 are secured thereto in a normal manner. The equalizer bar is adapted to slide longitudinally a relatively limited distance on the pivot pin in order to accommodate to the oscillation of the opposite undercarriages. Thus, the equalizer bar can limitedly rotate about the axis 208 approximately 5° in either direction, and such travel distance is limited by a pair of depending stop members 213 secured to the bottom of the main frame 12. Each outer end 214 of the equalizer bar is releasably connected to the rear portion 204 of the stabilizer beam 180 by a spherical coupling joint 216. A stepped cylindrical bore 218 formed through each of the outer ends 214 of the equalizer bar is adapted to tightly receive an outer bearing part 220 defining an internal spherical pocket portion 222. An inner bearing part 224 defining an external spherical surface portion 226 is seated for relative rotation in the outer bearing part, and also defines a cylindrical bore 228 therethrough. A cylindrical pin 230 is pressed into the bore 228, and this pin has a retaining plate 232 at one end which is releasably secured to the rear portion 204 of the stabilizing beam 180 by one or more threaded fasteners or bolts 234.

Referring now to FIG. 4, it can be seen that each one of the drive motor mechanisms 40 includes a wet disc-type brake 236 operatively associated with the hydraulic motor 126 and the drive wheel assembly 22. A shaft 238 on the central axis 42 is releasably secured to the output member 129 by an outer external spline 240. This shaft also has an inner external spline 242 which is adapted to non-rotatably receive a plurality of annular friction discs 244 thereon. A plurality of plates 246 are interleaved between these discs and are non-rotatably connected to an internal spline 248 defined on the inside of a housing extension 250. The housing extension defines a cylindrical bore 252 concentric with the central axis 42 and adapted to reciprocally receive an annular piston 254 therein. A retraction chamber 256 is formed within the housing extension axially outwardly of the piston, and when pressurized fluid is selectively delivered to this chamber in a conventional manner the piston is moved to the left when viewing FIG. 4 against the resistance of a plurality of compression springs 258, only diagrammatically illustrated for convenience. Thus, the brake 236 is hydraulically released on the one hand or alternatively is engaged by the springs 258 which cause movement of the piston to the right in the absence of sufficient operating pressure in the chamber 256.

The drive motor mechanism 40 further includes a wheel speed indicator apparatus 260 at the inner end of the housing extension 250. This apparatus includes a speed counter 262 mounted within the housing extension, and a shaft coupler 264 for driving the counter which is serially coupled to rotate with shaft 238. An inner cover 280 is releasably secured to the housing extension 250 to protect the counter.

Industrial Applicability

In operation, the vehicle 10 is driven by the operator in such a way that the output shafts 130 of the hydraulic motors 126 shown in FIG. 4 can be independently and selectively driven at any ground speed within a low working speed range or at an expanded traveling speed range with a relatively higher maximum rate of speed. If the steering wheel, not shown, is disposed in a centered condition the speed of the output shafts 130 and associated drive wheel assemblies 22 will be maintained at identical values for straight ahead movement of the vehicle. This is assured by the counters 262 of the wheel speed indicator apparatuses 260 which can accurately count even relatively low speed rotation of the drive wheel assemblies 22.

As the steering wheel, not shown, is rotated by the operator in a conventional manner, the speed signals from the counters 262 associated with the respective drive wheel assemblies 22 are caused to reflect a speed difference proportionate to the angular degree of steering wheel movement and in the desired direction. A suitable control apparatus, not illustrated, thereafter selectively and proportionately causes more flow to one of the hydraulic motors !26 and less flow to the opposite hydraulic motor so that the vehicle is controllably steered in the desired direction. Since one drive motor mechanism 40 can be locked or even controllably reversed in rotational direction while the opposite drive motor mechanism is rotating in the forward direction, a compact pivot turn of the combine harvester can be easily achieved. Thus, the suspension structure 28 provides superior maneuverability than wheel systems or combined track and steering wheel systems.

At any time the brakes 236 may be simultaneously applied by the vehicle operator to slow down or to brake the vehicle. This is accomplished by controllably reducing the pressurized fluid delivered to the retraction chambers 256 to the extent that the force of the compression springs 258 overcomes the resistance thereof upon the pistons 254 and moves the actuating pistons axially outwardly to clamp the interleaved discs and plates 244 and 246 together to slow down or stop the rotation of the shafts 238, the output shafts 130 of the motors 126, and the drive wheel assemblies 22 serially connected therewith.

When the vehicle 10 travels over uneven terrain, for example, the rearward end of the right track roller frame 66 may swing downwardly about the front pivot axis 36 while the rearward end of the left track roller frame 66 swings upwardly about the same front pivot axis due to their common connection to the centrally pivoted equalizer bar 206. As the track roller frames move in opposite directions, the equalizer bar will swing about the pivot pin 21 and cause the spherical coupling joints 216 to travel in arcuate paths about the axis 208. But since the equalizer bar travels through only a limited angular range, the amount of relative travel between the spherical bearing parts 220,224 is minimal and the amount of laterally inward movement of each of the track roller frames above and below the horizontal level is also minimal.

The track roller frame 66, front and rear wheel assemblies 24 and 22, the track belt 26, and the drive motor mechanism 40 at one side of the vehicle 10 can be very simply removed as a unit from the main frame 12. It is only necessary to place a support such as an adjustable jack, not illustrated, under the front end 14 of the main frame to enable the pivot joint 34 shown in FIG. 3 to be uncoupled. Fasteners 48 are screwthreadably released to allow the lower retention caps 47 to be disconnected from the upper support blocks 45. Advantageously, the tubular housing 50 and the stubshaft 54 can thereafter be moved away from the main frame without any lubricating fluid escaping from the chamber 60.

Another support, not illustrated, can be placed under the rear end 16 of the main frame 12 to permit the spherical coupling joint 216 to be uncoupled as can be visualized by reference to FIGS. 5, 6 and 8. The fastener 234 is released from the rear portion 204 of the stabilizer beam 180 so that the pivot pin 230 can be rearwardly withdrawn from the inner bearing part 224. This frees the entire track roller frame 66 from the main frame.

Alternatively, the drive motor mechanism 40, brake 236 and speed indicator apparatus 260 can be uncoupled for servicing as a unit without removal of a track roller frame 66 or the stabilizing beam 180 from the vehicle 10, and without propping up the main frame 12. In such an instance, the fasteners 198 shown in FIG. 5 are screwthreadably removed from the stabilizing beam 180 to free the adapter plate 196 therefrom, and the fasteners 136 shown in FIG. 4 are screwthreadably removed from the inner carrier member 134 to free the mounting flange 132 from the wheel assembly 22. When the hydraulic and electrical lines, not shown, are also uncoupled in a normal manner, these components can be moved laterally inwardly along axis 42 so that the housing 128, output shaft 130 and mounting flange 132 can be separated from the drive wheel assembly 22 and the equalizer beam 180.

It is to be recognized that the wet brake 236 can be separately serviced while the hydraulic motor 126 remains on the vehicle. For example, removal of a plurality of threaded fasteners 282 from the housing extension 250 will enable the inner cover 280 and speed indicator apparatus 260 to be freed from the housing extension. This provides access to the springs 258 and the piston 254, which can be withdrawn axially to the left when viewing FIG. 4 to permit full access to the brake discs 244 and plates 246 for servicing or replacement.

In view of the foregoing, it is apparent that the suspension structure 28 of the present invention is simple and rugged in construction, and very economical. Moreover, the front pivot joints 34 and the rear coupling assembly 38 are easily disconnected to permit the removal of either track-type undercarriage 18,20 as a module by removal of only a few fasteners. The bracing inside support device 171 and the outside support device 172 associated with each of the drive wheel assemblies 22 provide a dual path for operating forces on the track 26 to be transferred to the track roller frame 66. The forces of the recoil mechanism 122 that are associated with maintaining proper tension of the track 26 are transmitted from the rear drive wheel assembly 22 through the roller bearing assemblies 144 and 146 and forwardly into the track roller frame longitudinally aligned therewith. Both of these support devices can also be quickly and conveniently coupled or uncoupled. And furthermore, the suspension structure 28 is not only adaptable to a combine harvester, but also is adaptable to a wide variety of wagons, earthmoving vehicles, and military vehicles for example.

Preferably, the center of gravity 284 of the superstructure indicated in FIG. 1 is longitudinally located above about the center of the undercarriages 18 and 20 when the combine harvester 10 is loaded for even ground pressure distribution. Thus, the majority of the weight of the superstructure is supported by the front pivot joints 34 since they are located longitudinally much closer to the center of gravity than is the rear coupling assembly 38. This is desirable because the front end 14 of the main frame 12 of the combine harvester is of more rugged construction. It is to be recognized also that torsional or twisting loads on the track roller frames 66 about the longitudinal axes 63 are resisted only by the front pivot joints 34, since the rear coupling joints 216 include spherical parts. Also, these torsional loads are transferred to the main frame 12 through relatively strong connections at the brackets 44. The front idler wheel assemblies 24 are located as far forward as possible without interference with the implement 30, and the longitudinal distance thereof from the center of gravity 284 is approximately equal to the longitudinal distance of the rear drive wheel assemblies 22 to the center of gravity in order to provide a substantially uniform and relatively low ground pressure along the full length of the tracks 26. The rear coupling assembly supports a smaller proportion of the overall superstructure weight through the lighter frame construction of the rear end 16, and the oscillation of the undercarriages and the equalizer bar 206 results in greater elevational conformability of the pivot pin 210 and saddle assembly 212 at a location away from the harvesting implement 30.

Other aspects, objects and advantages of this invention can be obtained from a study of the drawings, the disclosures and the appended claims.

We claim:

1. In a vehicle of the type including a main frame having first and second ends, first and second undercarriages individually having a track roller frame, first and second wheel assemblies connected to the track roller frame, and a ground-engaging track encircling the wheel assemblies, a suspension structure for connecting the main frame to the undercarriages, comprising:

pivot means for pivotally connecting each of the undercarriages to the first end of the main frame and permitting pivotal movement thereof about a generally horizontal and transversely oriented axis, the supporting pivot means being located elevationally below the main frame and adjacent the second wheel assemblies;

an inside support device connected to each of the track roller frames and extending generally longitudinally laterally inwardly of the respective first wheel assemblies;

coupling means for centrally supporting the second ends of the main frame on the inside support devices and preventing uncontrolled lateral spreading of the undercarriages, and drive means for independently powerably rotating the first wheel assemblies including a motor mounted on each of the undercarriages away from the pivot means.

2. The suspension structure of claim 1 wherein the coupling means includes an equalizer bar having outer ends, means for pivotally connecting the equalizer bar to the main frame for rotation about a centrally located longitudinal axis, and a coupling joint for connecting each of the outer ends of the equalizer bar to the respective inside support device.

3. In a vehicle of the type including a main frame having first and second ends, first and second undercarriages individually having a track roller frame, first and second wheel assemblies and a ground-engaging track encircling the wheel assemblies, a suspension structure for connecting the main frame to the undercarriages, comprising:

pivot means for pivotally connecting each of the undercarriages to the first end of the main frame and permitting pivotal movement thereof about a generally horizontal and transversely oriented axis, the supporting pivot means being located elevationally below the main frame and adjacent the second wheel assemblies;

coupling means for centrally supporting the second end of the main frame on the undercarriages and preventing uncontrolled lateral spreading of the undercarriages, the coupling means including a stabilizing beam connected to each of the track roller frames, an equalizer bar centrally connected to the main frame and having opposite outer ends, and a coupling joint connecting each of the outer ends of the equalizer bar to the respective stabilizing beam, the coupling means being located adjacent the first wheel assemblies; and drive means for independently powerably rotating the first wheel assemblies including a motor mounted on each of the undercarriages away from the pivot means.

4. The suspension structure of claim 3 wherein the equalizer bar is located longitudinally beyond the first wheel assemblies.

5. The suspension structure of claim 3 wherein the drive means includes a housing containing each of the motors, and means for releasably connecting the stabilizing beam to the respective housing.

6. The suspension structure of claim 5 wherein the drive means includes an outside support device for each of the drive wheel assemblies, each of the outside support devices including clamping means for releasably clamping the drive wheel assembly to the respective track roller frame.

7. The suspension structure of claim 6 wherein each of the clamping means includes an extension member on the track roller frame defining a semi-cylindrical pocket, a retention cap defining a semi-cylindrical pocket, and a plurality of fasteners to releasably connect the retention cap to the extension member.

8. The suspension structure of claim 3 wherein the drive means includes a wheel speed indicating apparatus located laterally inwardly of each of the motors.

9. The suspension structure of claim 3 wherein the drive means includes a pair of motor housings, and including means for releasably connecting each of the housings to the respective stabilizing beam, and outside support means for releasably connecting each of the drive wheel assemblies to the respective track roller frame.

10. The suspension structure of claim 9 whereon the outside support means includes a pair of support bands, bearing assembly means within each of the support bands for rotatably supporting the respective drive wheel assembly, and clamping means for releasably securing each of the support bands to the respective track roller frame.

11. The suspension structure of claim 3 wherein the equalizer bar and the coupling joints are located longitudinally beyond the powerably rotated first wheel assemblies.

12. In a vehicle of the type including a main frame having a front end, a rear end, first and second undercarriages individually having a track roller frame, front and rear wheel assemblies and a ground-engaging track encircling the wheel assemblies, a suspension structure for connecting the main frame to the undercarriages, comprising:

pivot means for pivotally connecting each of the track roller frames to the front end of the main frame rearwardly of the front wheel assemblies and permitting pivotal movement of the undercarriages about a common horizontal and transversely oriented axis; and coupling means for centrally connecting the rear end of the main frame to the track roller frame and preventing uncontrolled lateral spreading of the undercarriages, the coupling means including a stabilizing beam connected to each of the track roller frames and having a rear portion thereon, an equalizer bar having outer ends, and a coupling joint connecting each of the outer ends of the equalizer bar to the respective rear portion of each stabilizing beam adjacent and laterally inwardly of the rear wheel assemblies.

13. The suspension structure of claim 12 wherein each of the coupling joints includes internal and external spherical bearing parts.

14. The suspension structure of claim 12 wherein each of the stabilizing beams has a front portion and means for releasably securing the front portion of the stabilizing beam to the respective track roller frame.

15. The suspension structure of claim 12 wherein the equalizer bar and the coupling joints are located rearwardly beyond the rear wheel assemblies.

16. The suspension structure of claim 12 wherein each of the rear wheel assemblies includes axially inner and outer wheel portions, a support band located between the wheel portions, bearing means for rotatably supporting the wheel portions within the band, and means for releasably connecting the band to the respective track roller frame.

17. The suspension structure of claim 16 wherein each of the rear drive wheel assemblies includes a housing releasably connected to the stabilizing beam and generally containing a hydraulic motor having an output shaft, and means for releasably connecting the output shaft to the respective inner and outer wheel portions.

18. A suspension structure for a vehicle having a main frame and an undercarriage including a track roller frame, a first wheel assembly and a second wheel assembly releasably connected to the track roller frame, and a ground-engaging track encircling the wheel assemblies, comprising:

a drive motor connected to rotatably drive the first wheel assembly along a common axis, the drive motor having a motor housing;

outside support means for releasably connecting the first wheel assembly to the track roller frame; and inside support means for releasably connecting the drive motor to the track roller frame, the inside support means including an elongate stabilizing beam releasably connected to the motor housing and the track roller frame.

19. The suspension structure of claim 18 wherein the stabilizing beam has a rear portion, and the suspension structure includes an equalizer bar centrally pivotally connected to the main frame, and a coupling joint connecting the equalizer bar to the rear portion of the stabilizing beam.

20. The suspension structure of claim 19 wherein the coupling joint is located longitudinally rearwardly of the first wheel assembly.

21. The suspension structure of claim 19 including pivot means for pivotally connecting the track roller frames to the main frame rearwardly adjacent the second wheel assembly.

22. The suspension structure of claim 18 wherein the first wheel assembly includes an inner wheel portion, an outer wheel portion, and bearing means for rotatably supporting the wheel portions, the outside support means including an extension of the track roller frame, a retention cap, and for removably securing the retention cap to the extension in an embracing relationship to the bearing means.

23. The suspension structure of claim 22 wherein the stabilizing beam defines an opening laterally therethrough for the drive motor, and the inside support means includes means for releasably securing the drive motor housing to the stabilizing beam adjacent the opening.

24. In a combine harvester of the type including a main frame having a front end, a rear end, an implement mounted on the front end, first and second undercarriages individually having a track roller frame, a front wheel assembly rearwardly adjacent the implement, a rear wheel assembly, and a ground-engaging track encircling the wheel assemblies, a suspension structure for connecting the main frame to the track roller frames, comprising:

a laterally spaced apart of pivot joints located rearwardly adjacent the front wheel assemblies for pivotally connecting the respective track roller frames to the front end of the main frame, each of the pivot joints including a stubshaft releasably connected to the respective track roller frame;

an equalizer bar having opposite outer ends;

first means for pivotally connecting the equalizer bar to the rear end of the main frame; and second means for connecting each of the track roller frames to the respective outer ends of the equalizer bar, the first and second means locating the equalizer bar longitudinally to the rear of the rear wheel assemblies.

* * * * *